(12) United States Patent
Kayama et al.

(10) Patent No.: US 7,692,345 B2
(45) Date of Patent: Apr. 6, 2010

(54) VIBRATION-GENERATING DEVICE AND ELECTRONIC APPARATUS USING THE SAME

(75) Inventors: Shun Kayama, Saitama (JP); Yukiko Shimizu, Saitama (JP); Toshinori Yamasue, Shiga (JP); Hiroshi Azuma, Osaka (JP); Hirokazu Kitamura, Kyoto (JP)

(73) Assignees: Sony Corporation, Tokyo (JP); Omron Corporation, Kyoto-shi (JP)

( * ) Notice: Subject to any disclaimer, the term of this patent is extended or adjusted under 35 U.S.C. 154(b) by 0 days.

(21) Appl. No.: 10/546,037

(22) PCT Filed: Feb. 10, 2004

(86) PCT No.: PCT/JP2004/001399

§ 371 (c)(1),
(2), (4) Date: May 26, 2006

(87) PCT Pub. No.: WO2004/075377

PCT Pub. Date: Sep. 2, 2004

(65) Prior Publication Data

US 2006/0250036 A1    Nov. 9, 2006

(30) Foreign Application Priority Data

Feb. 18, 2003  (JP) .............................. 2003-039969

(51) Int. Cl.
*H02K 7/06* (2006.01)
(52) U.S. Cl. .................. 310/81; 310/156.32; 310/90
(58) Field of Classification Search .................. 310/81
See application file for complete search history.

(56) References Cited

U.S. PATENT DOCUMENTS 3,953,752 A    4/1976    Bannon (Continued)

FOREIGN PATENT DOCUMENTS

EP    1035633 A1 *    9/2000

(Continued)

OTHER PUBLICATIONS

G. W. Jewell, et al., "The Design of Radial-Field Multipole Impulse Magnetizing Fixtures for Isotropic NdFeB Magnets", IEEE Transactions on Magnetics, vol. 33, No. 1, XP-011031162, Jan. 1997, pp. 708-722.

*Primary Examiner*—Quyen Leung
*Assistant Examiner*—Alex W Mok
(74) *Attorney, Agent, or Firm*—Oblon, Spivak, McClelland, Maier & Neustadt, L.L.P.

(57) ABSTRACT

The present invention is directed to a vibration generating device used for mobile telephone, etc., which comprises a rotor (110), and a stator (120) for rotatably supporting the rotor, and serving to rotate the rotor to thereby generate vibration. The rotor comprises a bearing sleeve (160) consisting of resin molded material and rotatably attached to a fixed shaft (124) provided at the stator, a magnet (170) and a weight (180) positioned in eccentric state with respect to the bearing sleeve, wherein the bearing sleeve and the magnet are formed in the state where they are integrated by material resin of the bearing sleeve. The stator comprises, in addition to the fixed shaft, a bottom plate (121), a cover plate (122) and a coil (140) disposed in a manner opposite to the magnet, whereby the coil is energized so that the rotor is rotated, and the bearing sleeve is rotated in the state in contact with the bottom plate or the cover plate by attractive force exerted between the magnet and the bottom plate or the cover plate.

18 Claims, 13 Drawing Sheets

U.S. PATENT DOCUMENTS

| | | | |
|---|---|---|---|
| 4,980,590 A * | 12/1990 | Taniguchi et al. | 310/81 |
| 5,027,025 A * | 6/1991 | Saneshige et al. | 310/156.38 |
| 6,051,900 A * | 4/2000 | Yamaguchi | 310/81 |
| 6,104,109 A * | 8/2000 | Sato | 310/40 MM |
| 6,274,955 B1 * | 8/2001 | Satoh et al. | 310/71 |
| 6,365,994 B1 | 4/2002 | Watanabe et al. | |
| 6,417,589 B1 * | 7/2002 | Kuyama et al. | 310/81 |
| 6,515,400 B2 * | 2/2003 | Park | 310/268 |
| 2001/0011849 A1 * | 8/2001 | Yamaguchi | 310/71 |
| 2002/0096950 A1 * | 7/2002 | Kajiwara et al. | 310/81 |
| 2002/0195890 A1 * | 12/2002 | Sun | 310/81 |

FOREIGN PATENT DOCUMENTS

| | | |
|---|---|---|
| JP | 62-11360 | 1/1987 |
| JP | 63-220747 | 9/1988 |
| JP | 2-41657 | 3/1990 |
| JP | 2-79762 | 3/1990 |
| JP | 5-161327 | 6/1993 |
| JP | 5-316680 | 11/1993 |
| JP | 9-271160 | 10/1997 |
| JP | 10-248203 | 9/1998 |
| JP | 10-295067 | 11/1998 |
| JP | 2001-50251 | 2/2001 |
| JP | 2001-157399 | 6/2001 |
| JP | 2001286089 A * | 10/2001 |
| JP | 2002-74817 | 3/2002 |
| JP | 2002-142427 | 5/2002 |
| JP | 2002-165430 | 6/2002 |
| KR | 2002-0060673 | 7/2002 |

* cited by examiner

VIBRATION-GENERATING DEVICE AND ELECTRONIC APPARATUS USING THE SAME

TECHNICAL FIELD

The present invention relates to a vibration generating device and an electronic equipment using such a vibration generating device.

This Application claims priority of Japanese Patent Application No. 2003-039969, filed on Feb. 18, 2003, the entirety of which is incorporated by reference herein.

BACKGROUND ART

Hitherto, there are electronic equipments using a vibration generating device for transmitting vibration to user. As an example, there can be mentioned portable or mobile telephones. Such mobile telephones have such a configuration to generate vibration at the time of the so-called manner mode to thereby have ability to notice message arrival (calling) to user. In such mobile telephones, a vibration generating device as a vibration actuator adapted for generating vibration is included therewithin.

As a vibration generating device used in mobile telephone, there is a vibration generating device constituted as shown in FIG. 1. In the vibration generating device 1 shown in FIG. 1, a weight 4 is fixed to an output shaft 3 of a motor 2 with brush in the eccentric state with respect to the output shaft 3.

The vibration generating device 1 takes out, as vibration component, rotation unbalance energy generated as the result of the fact that the output shaft 3 is rotated by drive of the motor 2 so that the weight 4 is eccentrically rotated. In such vibration generating device 1, there are problems as described below.

When the motor 2 with brush is used as a drive source, since unsatisfactory phenomenon in rotation due to the so-called slit short, etc. cannot be zero, there is the problem that there lacks in reliability of vibration generating operation.

The motor body can be reduced to, e.g., about 3.5 mm in diameter, but there is the problem that it is required to increase the number of rotations for the purpose of obtaining vibration energy of a desired magnitude so that power consumption is excessively elevated followed thereby. In portable or mobile electronic equipments using battery as a power source such as mobile telephone, elevation of power consumption is not preferable from a viewpoint of battery life, etc.

Moreover, when attempt is made to reduce the diameter of the motor body to dispose the weight at the inside of the motor diameter, it fails to set, to a large value, quantity of eccentricity of weight for generating rotation unbalance energy. As a result, vibration component would be reduced.

In order to set quantity of eccentricity of the weight to a large value, it is required to fit rubber ring, etc. with respect to the output shaft to attach the weight to the rubber ring, etc. to ensure quantity of eccentricity of the weight, or to amplify the vibration component so that realization of thin structure and miniaturization of the vibration generating device 1 resultantly becomes difficult. In addition, there is also the problem that since the number of parts is increased, it is difficult to realize reduction in cost, or increase in the number of parts lowers the reliability of the vibration generating operation.

In view of the above, the applicant has proposed, in the Specification and the Drawings of the Japanese Patent Application No. 2002-186555, a vibration generating device in which the weight is provided at the eccentric position of the rotor provided at the plane opposite type motor where the rotor magnet and the stator coil are disposed in a manner flatly opposite to each other.

In the vibration generating device, since the rotor and the stator are opposed in a plane manner, realization of thin structure and miniaturization can be made. Moreover, since the diameter of the rotor can be set to large value, quantity of eccentricity of the weight can be taken as a large value. Large rotation unbalance energy can be obtained as compared to mass of the weight. Thus, large vibration can be obtained by small power consumption. Since this motor is brushless motor, there is no possibility that unsatisfactory phenomenon in rotation by the so-called slit shot may take place. Thus, device having high reliability is provided.

Meanwhile, the vibration generating device proposed in the Specification and the Drawings of the above-mentioned application is caused to be of the configuration in which assembly is made such that respective members constituting the rotor, i.e., the shaft, the rotor yoke, the rotor magnet, the ring and the weight are all formed as individual parts thereafter to fix the ring to the shaft to fix the rotor yoke to the ring to fix the rotor magnet and the weight to the rotor yoke. For this reason, not only the number of assembling steps is increased, and the cause such that manufacturing cost is elevated is constituted, but also it is necessary to form mutual coupling portions for assembling at respective members constituting the rotor so that there are limits in miniaturization of the rotor itself and miniaturization of dimensions in the axial direction of the shaft, i.e., realization of thin structure.

In addition, it is necessary to provide bearing unit for rotatably supporting the shaft of the rotor at the stator so that realization of thin structure is limited to such a degree that the thickness of the bearing device, i.e., the size in the axial direction is required.

DISCLOSURE OF THE INVENTION

An object of the present invention is to provide a novel vibration generating device and a novel electronic equipment using such a vibration generating device which can solve the problems that prior arts as described above have.

Another object of the present invention is to provide further miniaturization and realization of thin structure of a vibration generating device, and to provide further miniaturization and realization of thin structure of an electronic equipment using such a vibration generating device.

The vibration generating device according to the present invention is directed to a vibration generating device including a rotor and a stator for rotatably supporting the rotor, and serving to rotate the rotor to thereby generate vibration, wherein the rotor comprises a bearing sleeve consisting of resin molded material and rotatably attached to a fixed shaft vertically provided at the stator, a magnet, and a weight positioned in eccentric state with respect to the bearing sleeve. The bearing sleeve and the magnet are formed in the state where they are integrated by material resin of the bearing sleeve, and the stator comprises, in addition to the fixed shaft, a bottom plate, a cover plate and a coil disposed in a manner opposite to the magnet, whereby the coil is energized so that the rotor is rotated, and the bearing sleeve is rotated in the state in contact with the bottom plate or the cover plate by attractive force exerted between the magnet and the bottom plate or the cover plate.

In the vibration generating device according to the present invention, shapes of respective members constituting the rotor are simplified and the structure of the rotor itself is simplified. Accordingly, miniaturization and realization of thin structure of the rotor itself can be performed. Moreover, since there is employed the structure in which the sleeve of the rotor fitted over the fixed shaft of the stator is rotated in the state in contact with the bottom plate or the cover plate, the bearing structure of the stator side is simplified. Thus, miniaturization and realization of thin structure of the entirety of the vibration generating device can be performed.

Since the motor of the vibration generating device according to the present invention is the brushless motor, reliability is excellent, stable operation can be performed, and low power consumption can be realized.

Moreover, the electronic equipment according to the present invention comprises a vibration generating device including a rotor, and a stator for rotatably supporting the rotor, and serving to rotate the rotor to thereby generate vibration. Here, the rotor comprises a bearing sleeve consisting of resin molded material and rotatably attached to a fixed shaft vertically provided at the stator, a magnet, and a weight positioned in eccentric state with respect to the bearing sleeve. The bearing sleeve and the magnet are formed in the state where they are integrated by material resin of the bearing sleeve. The stator comprises, in addition to the fixed shaft, a bottom plate, a cover plate and a coil disposed in a manner opposite to the magnet, whereby the coil is energized so that the rotor is rotated, and the bearing sleeve is rotated in the state in contact with the bottom plate or the cover plate by attractive force exerted between the magnet and the bottom plate or the cover plate.

Since the electronic equipment according to the present invention uses the vibration generating device in which miniaturization and realization of thin structure has been performed, miniaturization and realization of thin structure of the equipment itself can be performed.

Since the vibration generating device used in the electronic equipment uses the brushless motor, the reliability is excellent, stable operation can be performed, and low power consumption can be realized. Accordingly, not only the vibration mode having high reliability can be obtained, but also effective use time of the battery can be elongated.

Still further objects of the present invention and practical merits obtained by the present invention will become more apparent from the description of the embodiments which will be given below with reference to the attached drawings.

BEST MODE FOR CARRYING OUT THE INVENTION

A vibration generating device and an electronic equipment using such a vibration generating device according to the present invention will now be described with reference to the attached drawings.

Figure 1:
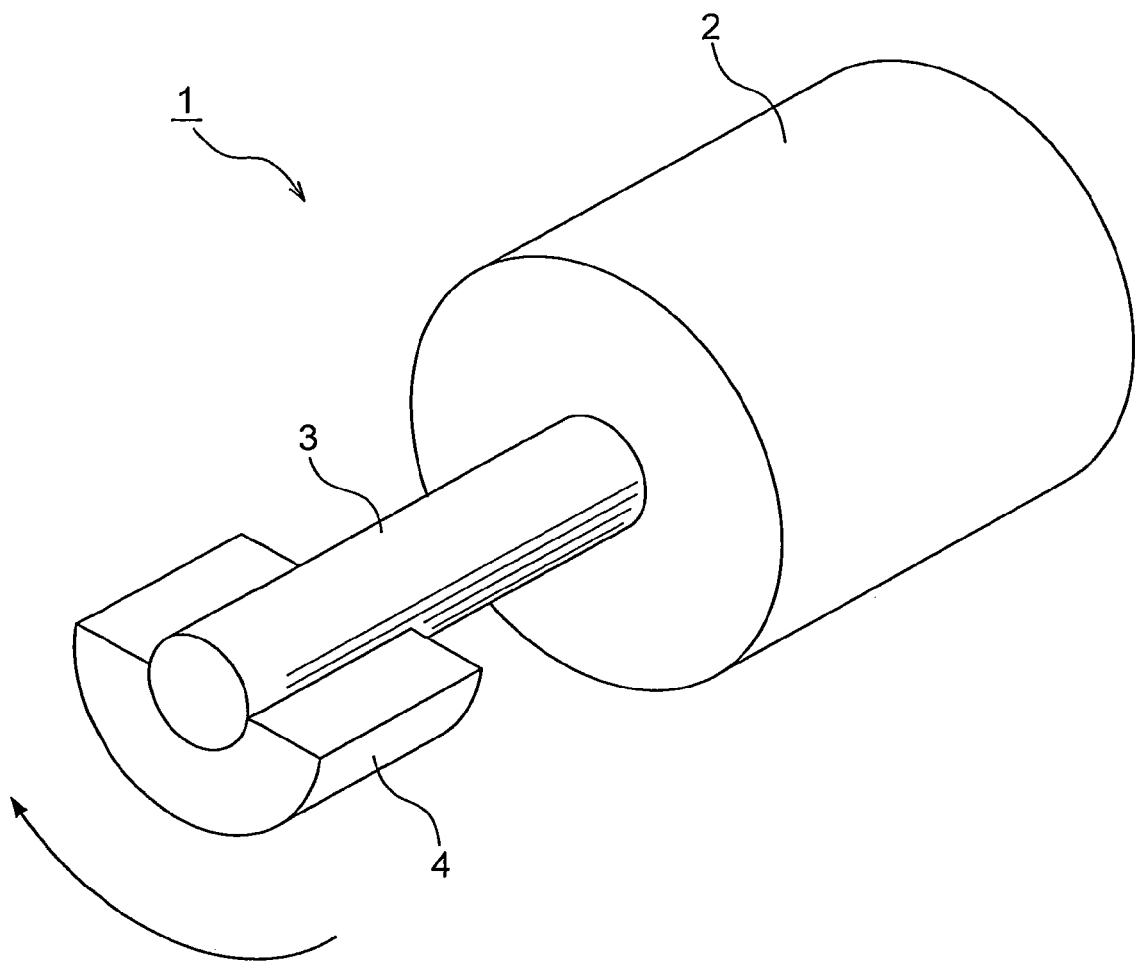
FIG. 1 is a perspective view showing an example of a conventional vibration generating device.
Figure 2:
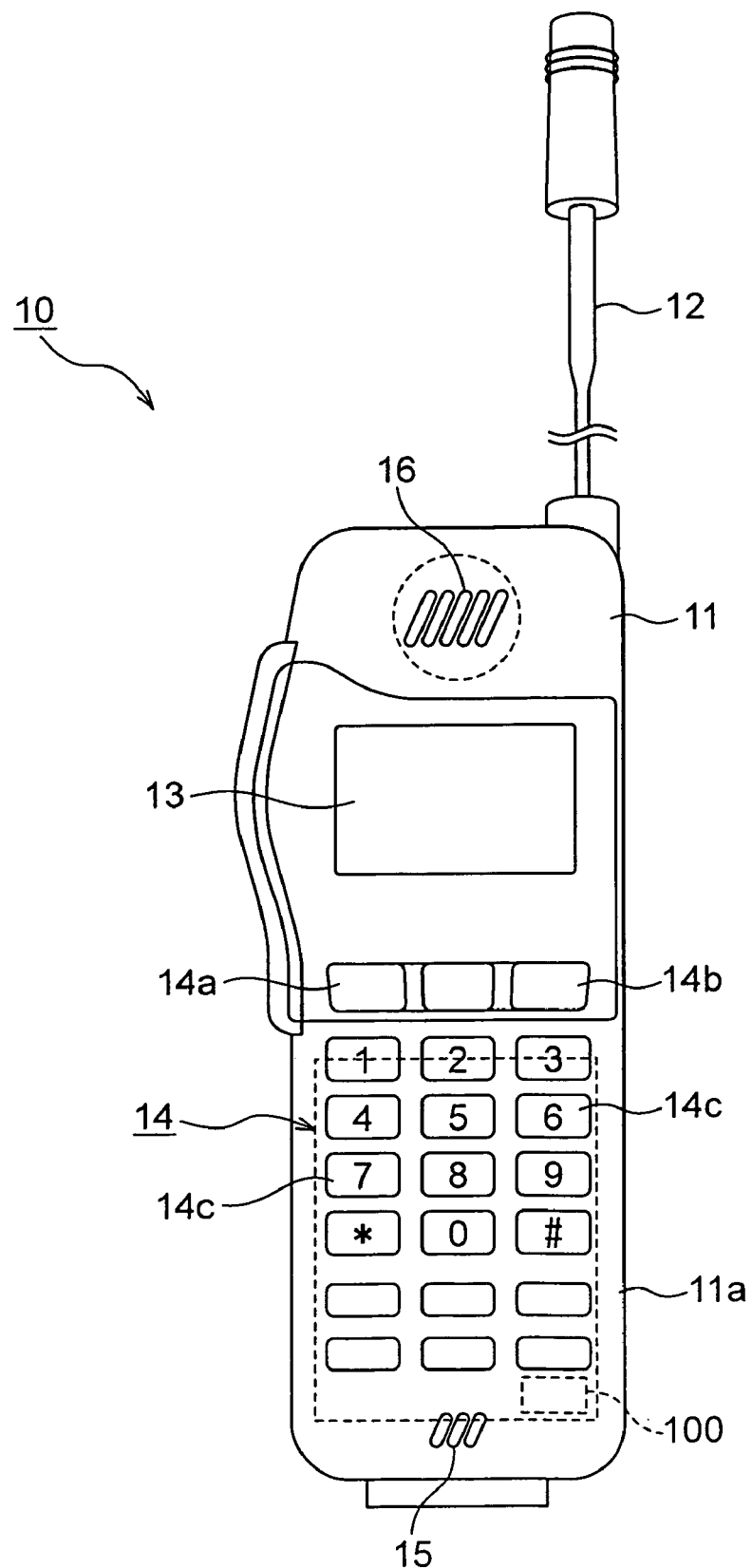
FIG. 2 is a front view showing a mobile telephone in which a vibration generating device according to the present invention is used.
Figure 3:
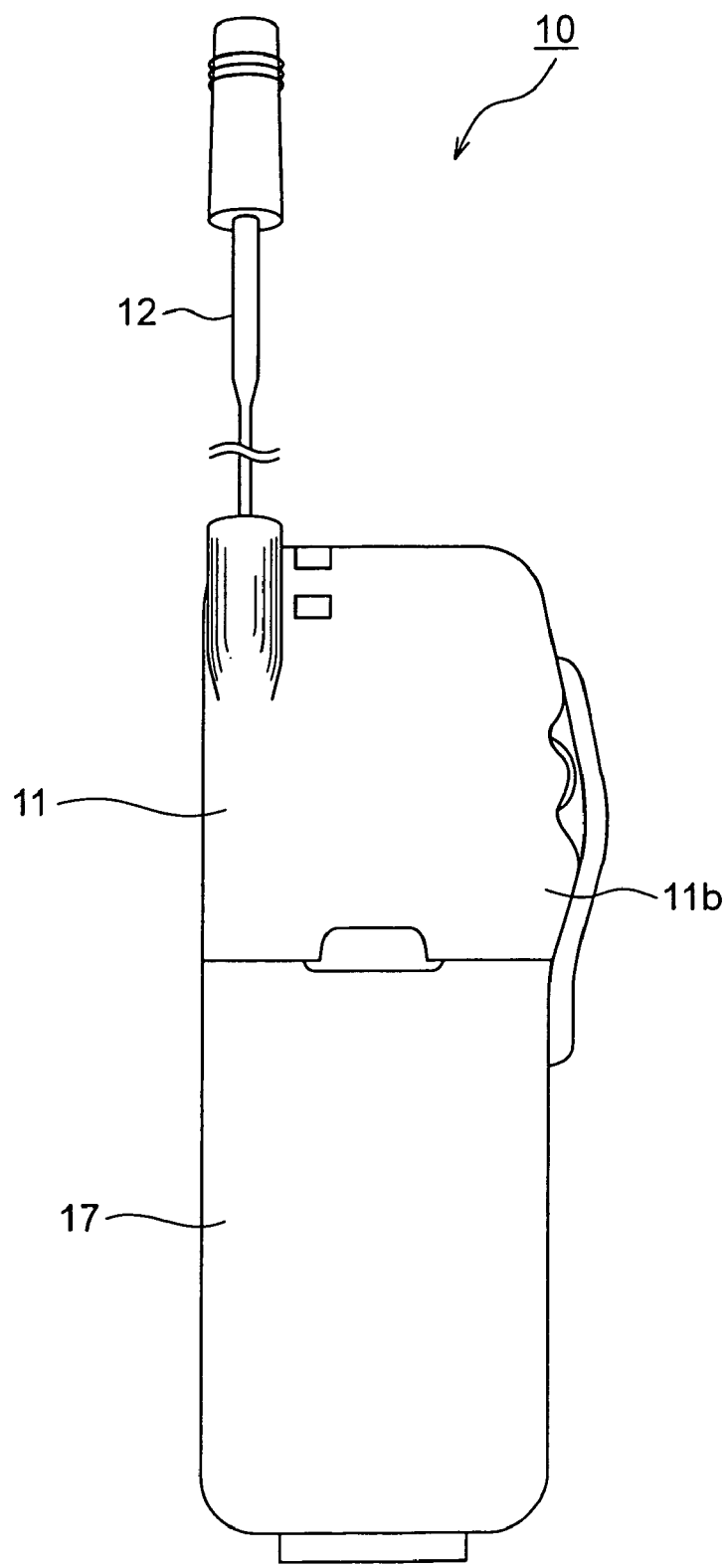
FIG. 3 is a back view thereof.

FIGS. 2 and 3 shows a mobile (portable) telephone 10 as an example of the electronic equipment to which the vibration generating device according to the present invention is applied.

The mobile telephone 10 is a telephone of the digital system having the frequency range of, e.g., 0.8 to 1.5 GHz, and comprises a casing (housing) 11 constituting the equipment body, an antenna 12, a display unit 13, an operation unit 14, a microphone 15, and a speaker 16, etc.

The operation unit 14 includes, as shown in FIG. 2, various operation members such as a speech button 14a, an OFF button 14b for speech, ten keys 14c, 14c, . . . , etc. As the display unit 13, e.g., a liquid crystal display device is used. Thus, various displays of telephone Nos. of speech destinations, contents of the telephone book, web site picture by Internet communication, preparation picture for transmission mail, and contents of received mailes, etc. are performed.

The casing 11 includes a front portion 11a shown in FIG. 2, and a rear portion 11b shown in FIG. 3, wherein a battery 17 is detachably attached at the rear portion 11b side. An antenna 12 is attached so that it is taken in and out with respect to the casing 11.

At the inside of the casing 11, a vibration generating device 100 is included therewithin. The vibration generating device 100 has a function to generate vibration in the case where, e.g., message arrival takes place in the mobile telephone 10 to notice that message arrival to user by vibration.

It is to be noted that the above-described mobile telephone 10 is an example as the electronic equipment according to the present invention, and the vibration generating device according to the present invention may be used also for electronic equipment except for mobile telephones so that the electronic equipment according to the present invention can be realized. Moreover, the function that the vibration generating device performs by vibration is not also limited to message arrival (calling) notifying function at the mobile telephone 10, but can be used also for the purpose of executing other functions.

Then, the vibration generating device according to the present invention will be explained with reference to FIGS. 4 to 10.

Figure 4:
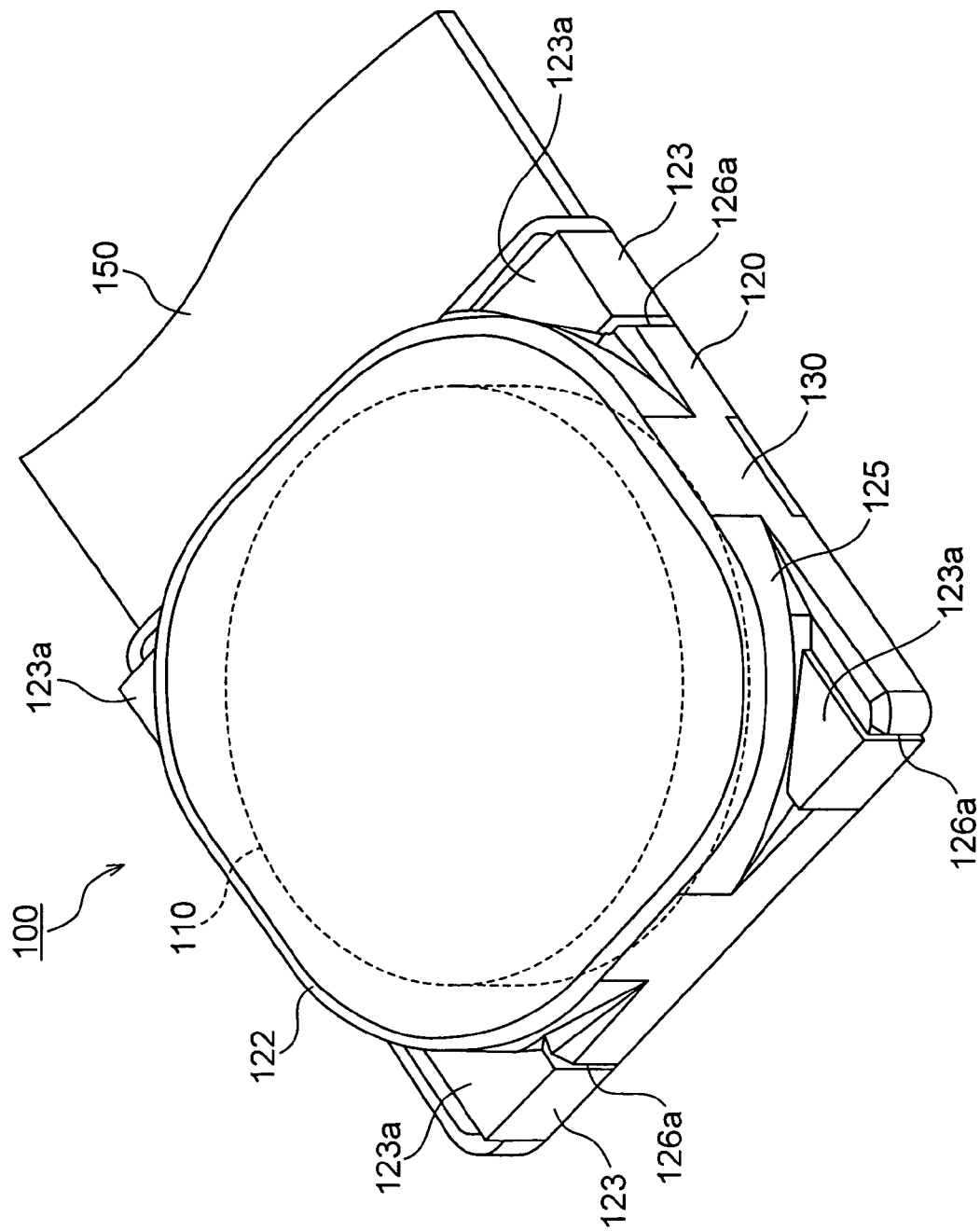
FIG. 4 is a perspective view showing the vibration generating device according to the present invention.

The vibration generating device 100 according to the present invention includes a rotor 110, and a stator 120 for rotatably supporting the rotor 110. As shown in FIG. 4, a case 130 is formed by a stator yoke 121 and a cover plate 122 for covering the upper portion of the stator yoke 121 with the stator yoke 121 serving as main component of the stator 120 being as bottom plate, and the rotor 110 is rotatably accommodated within the case 130.

The stator yoke 121 is formed by magnetic material, e.g., iron, or stainless steel plate or silicon steel plate having magnetic property (magnetism), etc., and is a member constituting closed magnetic path. Moreover, it is to be noted that while the cover plate 122 is also formed by magnetic material, the cover plate 122 is not necessarily required in the present invention. In addition, even in the case where the cover plate 122 is provided, it is not necessary to form that cover plate by magnetic material.

Figure 5:
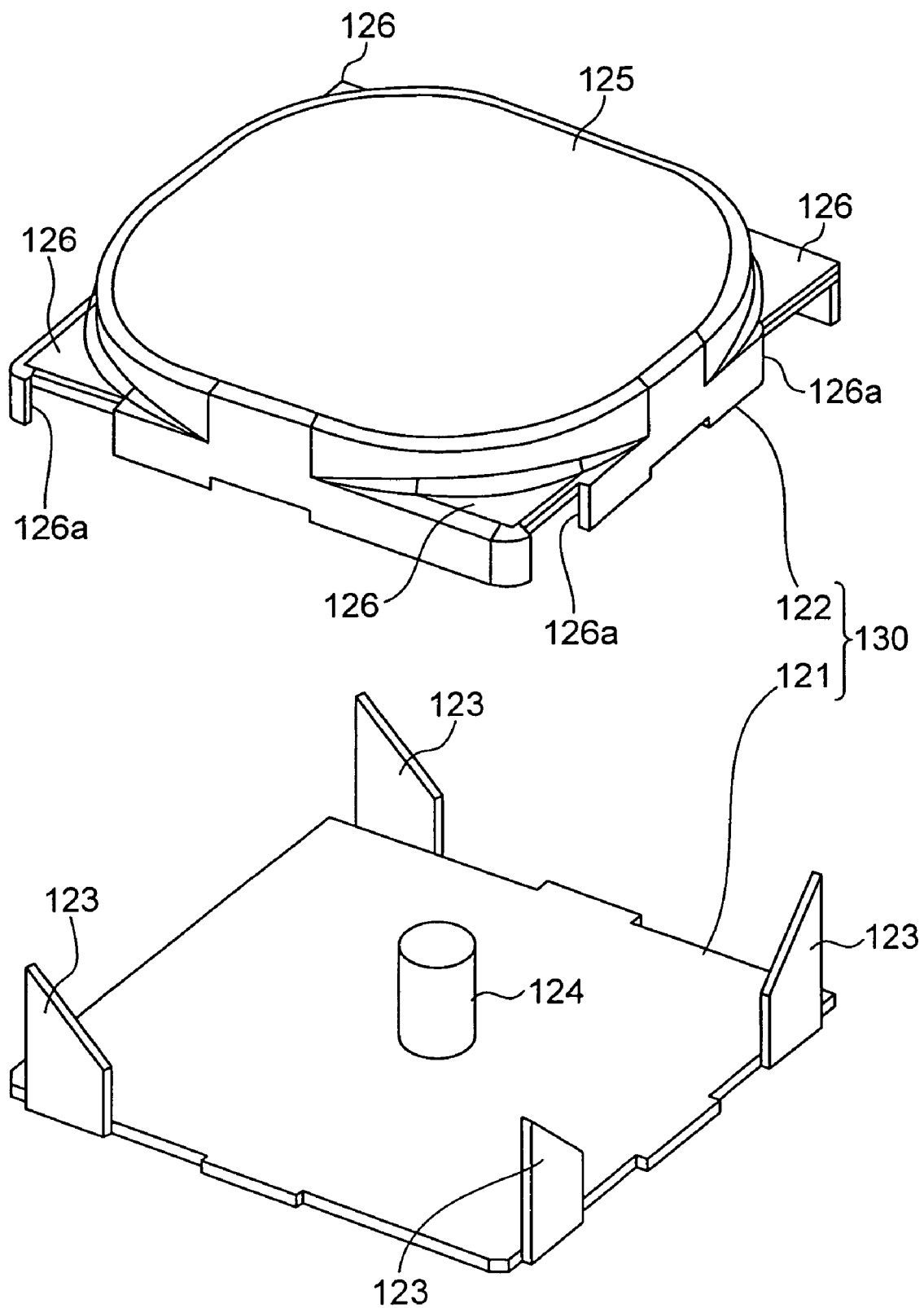
FIG. 5 is a perspective view in the state where the case is decomposed.
Figure 6:
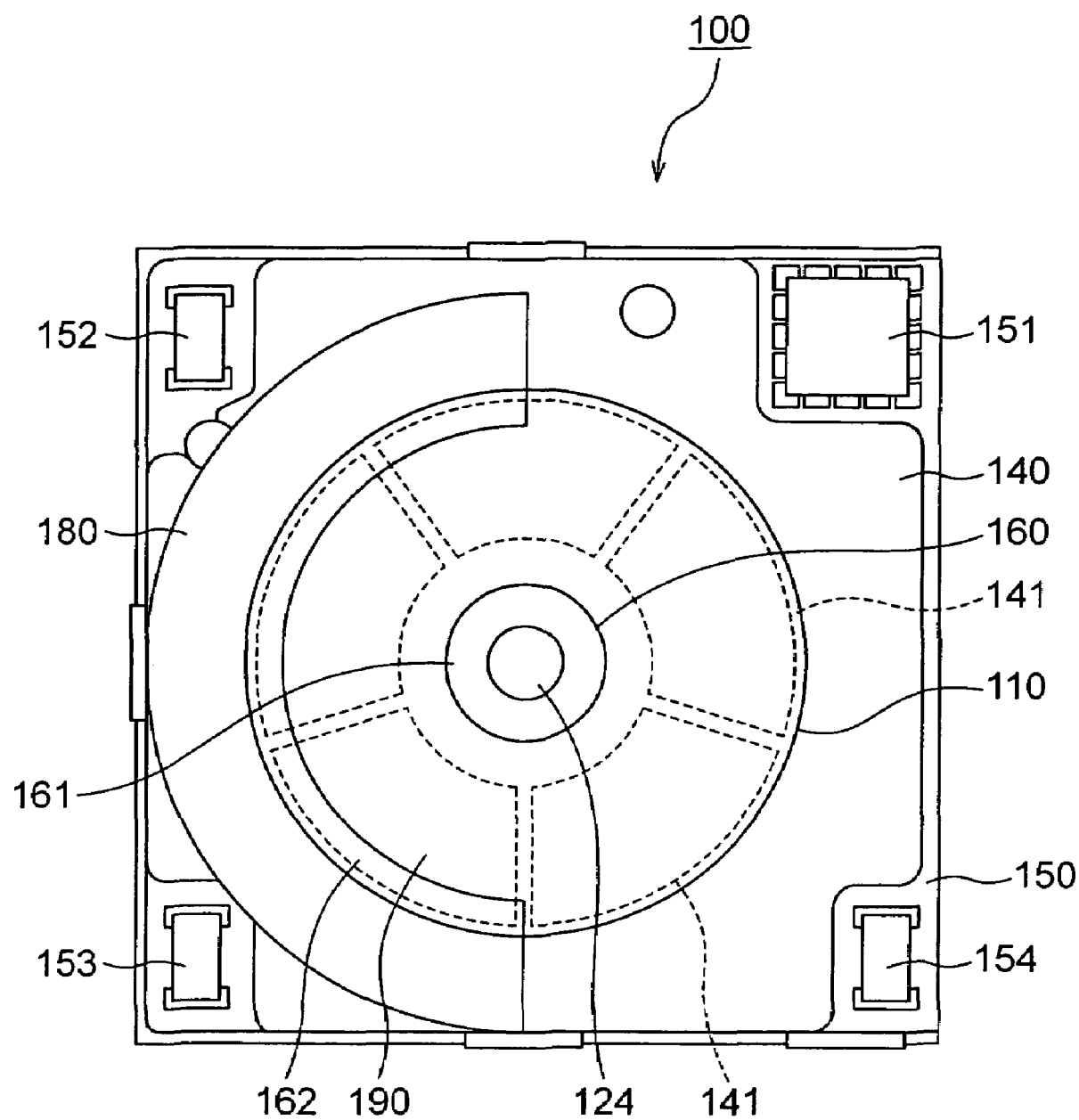
FIG. 6 is a plan view showing the vibration generating device according to the present invention in the state where cover plate is detached.

As shown in FIG. 5, the stator yoke 121 is a plate member formed so as to have substantially square shape, wherein caulking portions 123, 123, . . . are vertically provided from four corners of the stator yoke 121. Moreover, a cylindrical fixed shaft 124 is vertically provided at the central portion of the stator yoke 121.

As shown in FIG. 5, the cover plate 122 has a shape such that four corner portions 126, 126, . . . are projected, so as to form four square corners, from the lower end portion outer edge of a cylindrical surrounding portion 125 in which axial length (height) is short (low), and is adapted so that cut portions 126a, 126a, . . . are respectively formed at side surfaces of the four corner portions 126, 126, . . . . Further, caulking portions 123, 123, . . . provided at corresponding position of the stator yoke 121 are fitted into cut portions 126a, 126a, . . . of the corner portions 126, 126, . . . , and substantially upper half portions 123a, 123a, . . . of the caulking portions 123, 123, . . . are mechanically caulked along the upper surfaces of the corner portions 126, 126, . . . (see FIG. 4) so that the case 130 for accommodating members constituting the rotor 110 and the stator 120 except for the stator yoke 121 is formed by the stator yoke 121 and the cover plate 122 as shown in FIG. 4.

The stator 120 includes, in addition to the above-mentioned stator yoke 121, a coil 140, a circuit wiring board 150, and plural electronic parts (components) 151 to 154 mounted on the circuit wiring board 150.

Figure 7:
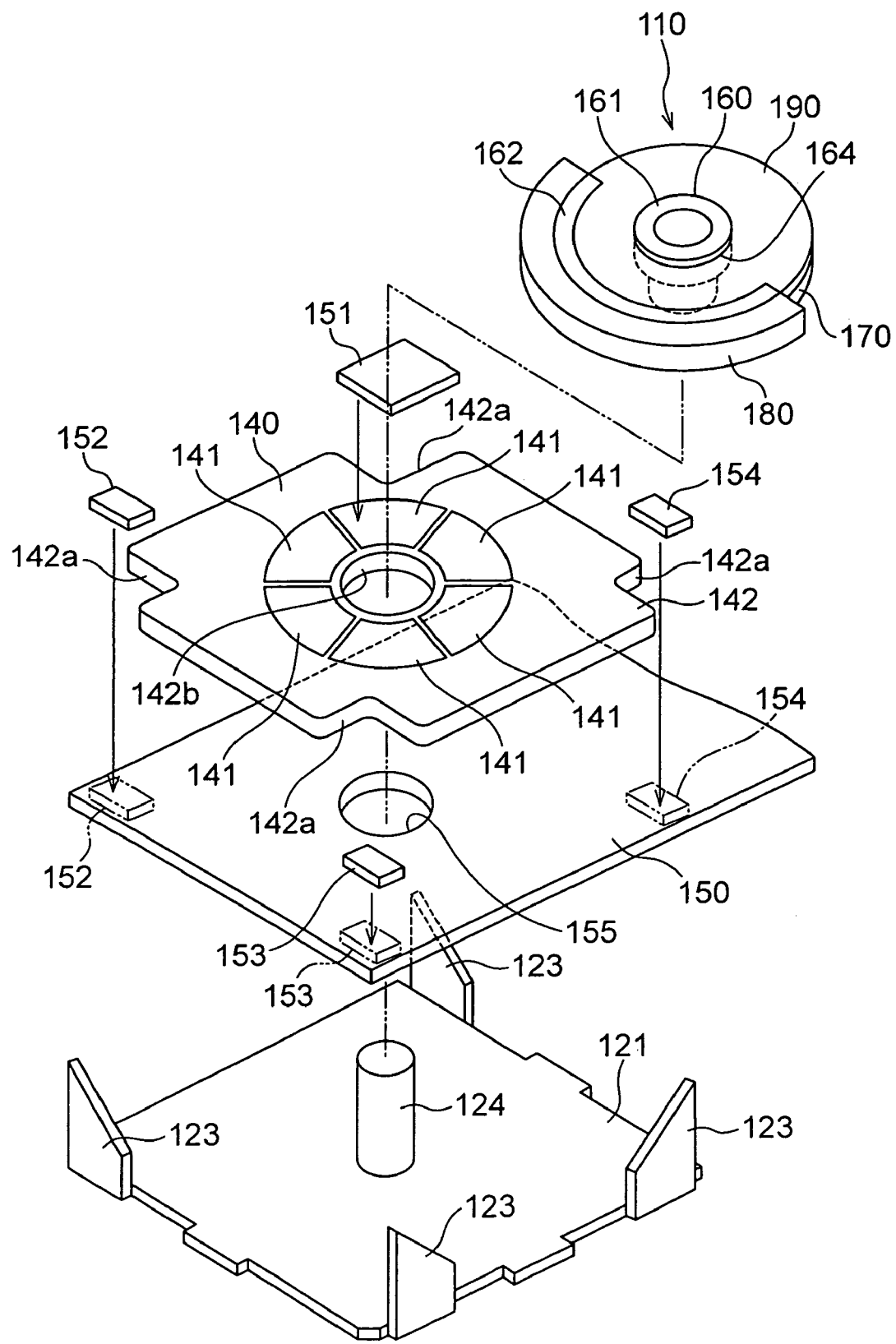
FIG. 7 is an exploded perspective view showing the essential part of the vibration generating device.
Figure 8:
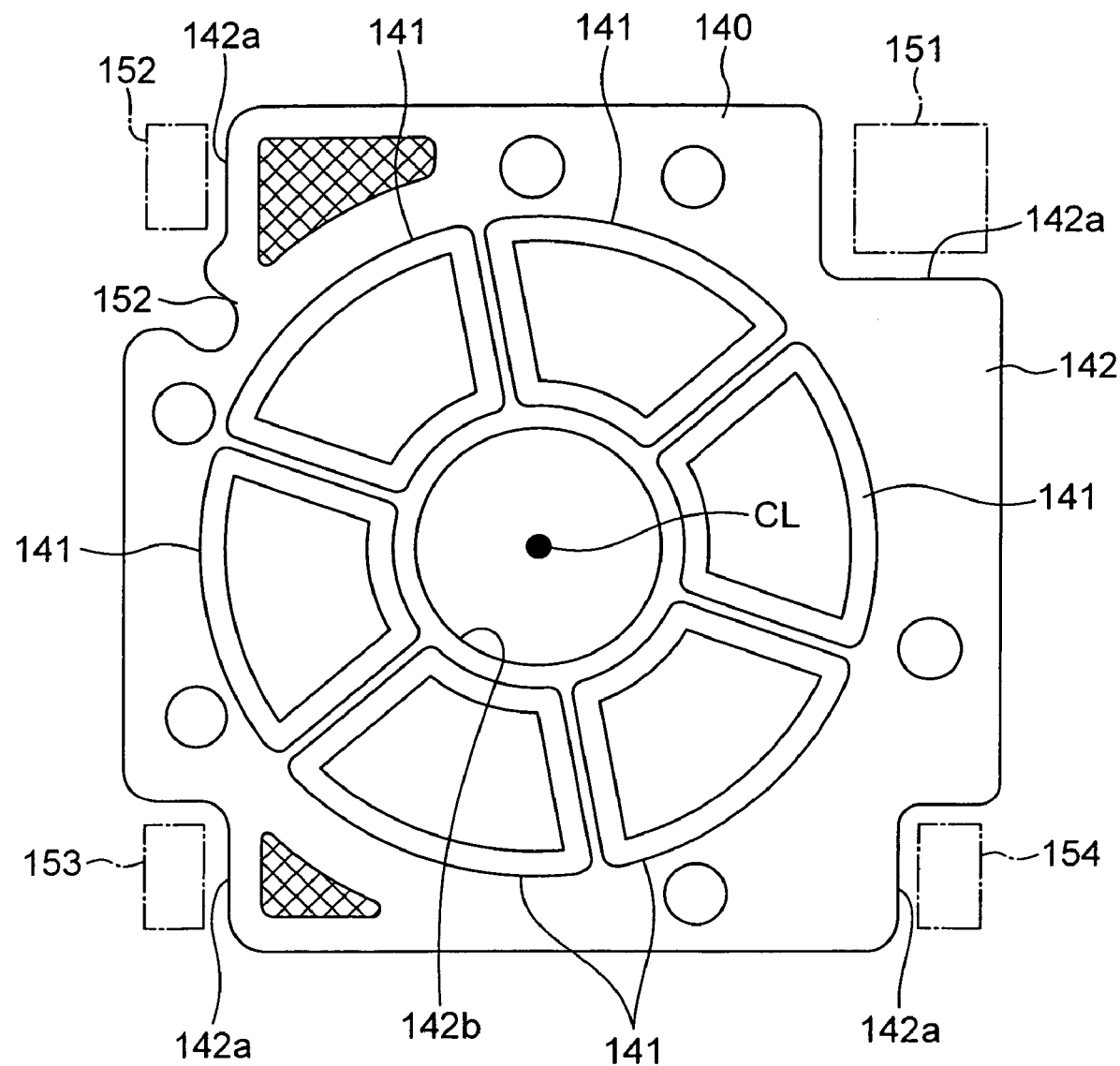
FIG. 8 is a schematic plan view showing the shape of winding portion of coil.

The coil 140 is constituted as the so-called flexible printed wiring boards. As shown in FIGS. 7 and 8, the coil 140 is adapted so that plural wiring portions 141, 141, . . . are formed on a flexible insulating substrate (base) 142. These winding portions 141 are formed so as to have, e.g., substantially sector shape. In the example shown in FIGS. 7 and 8, 6 (six) winding portions 141, 141, . . . are arranged in circumferential direction with the center axis CL being as center. These winding portions 141, 141, . . . are connected to drive circuit which will be described later through wiring pattern portion (not shown) formed on the circuit wiring board 150. Further, the winding portions 141 are covered by insulating material, e.g., polyimide so that they are electrically insulated or isolated with respect to the external.

At the insulating substrate 142 of the coil 140, as shown in FIGS. 7 and 8, there are formed cut portions 142a, 142a, . . . in order to avoid electronic parts (components) 151, 152, 153, 154. Moreover, at the central portion of the insulating substrate 142, there is formed a penetration hole 142b for inserting the fixed shaft 124 and the bearing sleeve which will be described later of the rotor 110.

Electrodes (not shown) of the electronic parts 151 to 154 are electrically connected to conductive patterns (not shown) of the circuit wiring board 150 directly by using solder. Since the electronic parts (components) 151 to 154 can be disposed in a manner to avoid the coil 140 irrespective of existence of the coil 140 in this way, miniaturization and realization of thin structure of the thickness of the vibration generating device 100, i.e., size in the center axis CL direction can be performed.

The circuit wiring board 150 of the stator 120 is fixed to the internal surface, i.e., the upper surface of the stator yoke 121 by, e.g., adhesive agent. Moreover, the coil 140 is fixed onto the upper surface of the circuit wiring board 150 by, e.g., adhesive agent. At the central portion of the circuit wiring board 150, there is formed a penetration hole 155 for inserting the fixed shaft 124 and the bearing sleeve which will be described later of the rotor 110.

It is to be noted that the coil 140 and the circuit wiring board 150 may be both constituted as the flexible printed wiring board, or only the coil 140 may be constituted as flexible printed wiring board and the circuit wiring board 150 may be constituted as rigid, i.e., hard substrate (base), e.g., glass epoxy substrate (base).

The coil 140 is constituted by laminating plural layers of flexible printed wiring boards, whereby the winding portion 141 is caused to be of plural layer structure, e.g., four layer structure to thereby have ability to perform realization of thin structure of the stator 120, in its turn, realization of thin structure of the vibration generating device 100 while performing increase in the torque constant in rotating the rotor 110. The energization method for the coil 140 and the drive circuit therefor will be described later.

The rotor 110 is rotatably disposed with respect to the stator 120 constituted as described above.

Figure 9:
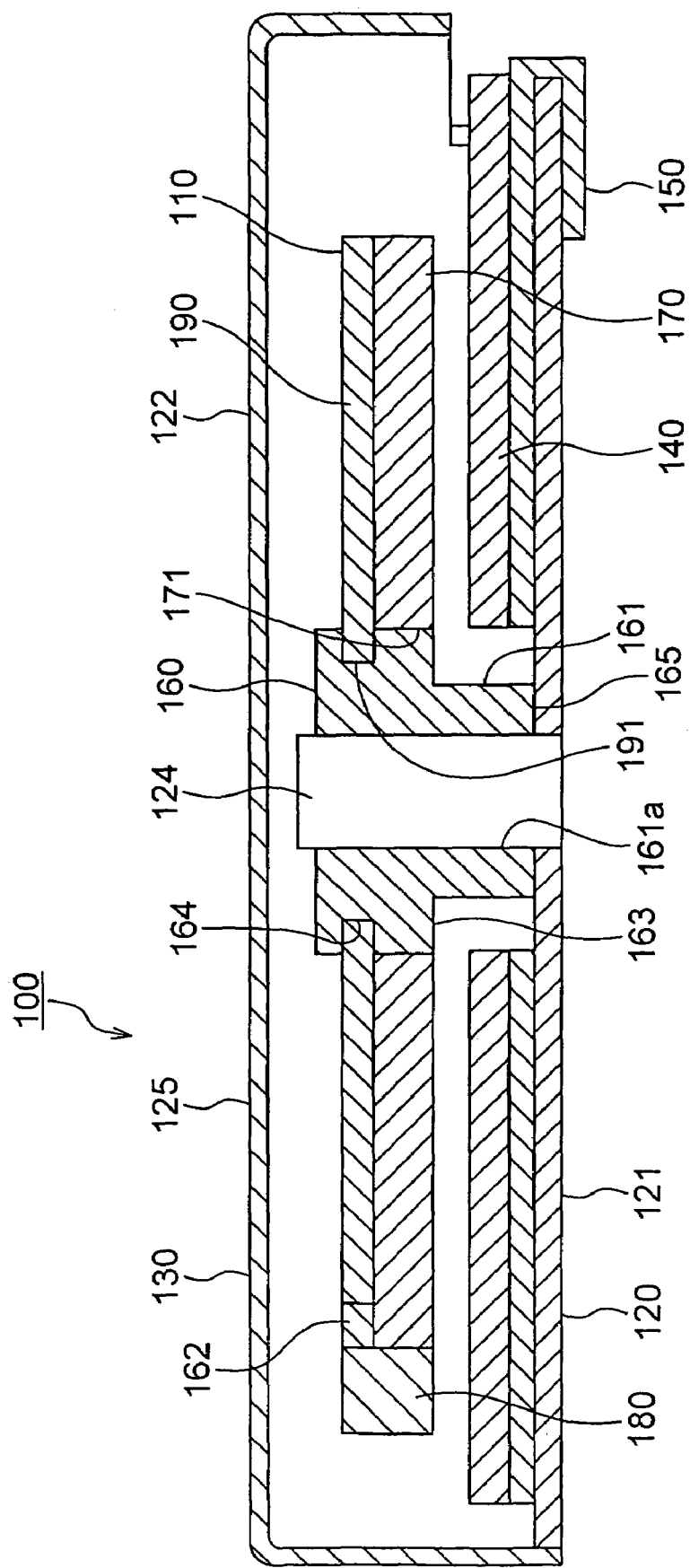
FIG. 9 is a longitudinal cross sectional view thereof.

As shown in FIG. 9, the rotor 110 is caused to be of the configuration in which a bearing sleeve 160, a rotor magnet 170, a weight 180 and a rotor yoke 190 are integrally formed.

The bearing sleeve 160 is formed as resin molded material, and is adapted so that a substantially cylindrical main portion 161 and a peripheral edge coupling portion 162 positioned at the outer peripheral edge portion are integrally formed through intermediate portion (not shown). The inner diameter of a center hole 161a formed in a manner to penetrate the center of the main portion 161 is formed so that it is slightly larger than outer diameter of the fixed shaft 124 of the stator 120. It is preferable that the bearing sleeve 160 is formed by material having small friction coefficient. For example, it is preferable that the bearing sleeve 160 is formed by PPS (polyphenylene sulfide) or LCP (Liquid Crystal Polymer) into which carbon fibers or carbon beads are mixed. It is to be noted that it is a matter of course to also form the bearing sleeve 160 by material except for materials illustrated here.

The rotor magnet 170 is formed so as to have doughnut shape or ring shape, and is formed by using sintered material of neodymium system or samarium-cobalt system in the state where S-poles and N-poles are multi-pole magnetized. Further, an inner circumferential surface 171 of the rotor magnet 170 is integrally molded in the state butted to the outer circumferential surface of the large diameter portion 163 formed at the position closer to the upper end of the main portion 161 of the bearing sleeve 160.

The rotor yoke 190 is formed by magnetic material, e.g., iron, stainless steel plate or silicon steel plate having magnetic property, etc. so that it has doughnut shape or ring shape, and is integrally molded in the state where its inner circumferential edge 191 is fitted into groove 164 formed at the upper end portion of the main portion of the bearing sleeve 160.

The weight 180 is formed so as to have circular arc shape, and is positioned over substantially half circumference at the outer circumferential portion of the rotor magnet 170 and the rotor yoke 190. In concrete terms, the peripheral edge coupling portion 162 of the bearing sleeve 160 is molded integrally with three members of the rotor magnet 170, the rotor yoke 190 and the weight 180. The weight 180 serves to take out, as vibration component, rotation unbalance energy when the rotor 110 is continuously rotated with the center axis CL of the fixed shaft 124 being as center with respect to the stator 120, and is formed by material having large specific gravity, e.g., tungsten, etc.

As described above, the rotor 110 is adapted so that the bearing sleeve 160, the rotor magnet 170, the weight 180 and the rotor yoke 190 are integrally formed. More particularly, in performing injection molding of the bearing sleeve 160, by the so-called insert molding method of inserting, in advance, the rotor magnet 170, the weight 180 and the rotor yoke 190 at a predetermined position of the metal mold for molding the bearing sleeve 160 to inject material resin of the bearing sleeve 160 into the metal mold in that state, the bearing sleeve 160, the rotor magnet 170, the weight 180 and the rotor yoke 190 are integrally formed.

As described above, since members constituting the rotor 110 are integrally molded, the rotor 110 is provided as a single part (component). Thus, handling such as parts management before assembly and/or carrying, etc. of the vibration generating device 100 is simplified. Moreover, since respective required members are integrated by material resin of the bearing sleeve 160, there is no necessity of providing coupling portion for mutual coupling at the rotor magnet 170, the weight 180, and the rotor yoke 190. Further, the shape is simplified so that reduction in cost by improvement in yielding can be realized. In addition, miniaturization and realization of thin structure can be made, and reliability is improved.

At the above-described rotor 110, the bearing sleeve 160 is rotatably externally fitted over the fixed shaft 124 of the stator 120. Further, by attractive force exerted between the stator yoke 121 and the rotor magnet 170, the rotor 110 is attracted toward the stator yoke 121, i.e., the bottom plate. Thus, there results the state where the lower end surface 165 of the bearing sleeve 160 is inserted through the insertion hole 142b of the coil 140 and the insertion hole 155 of the circuit wiring board 150 so that it is in contact with the bottom plate (stator yoke) 121.

Figure 10:
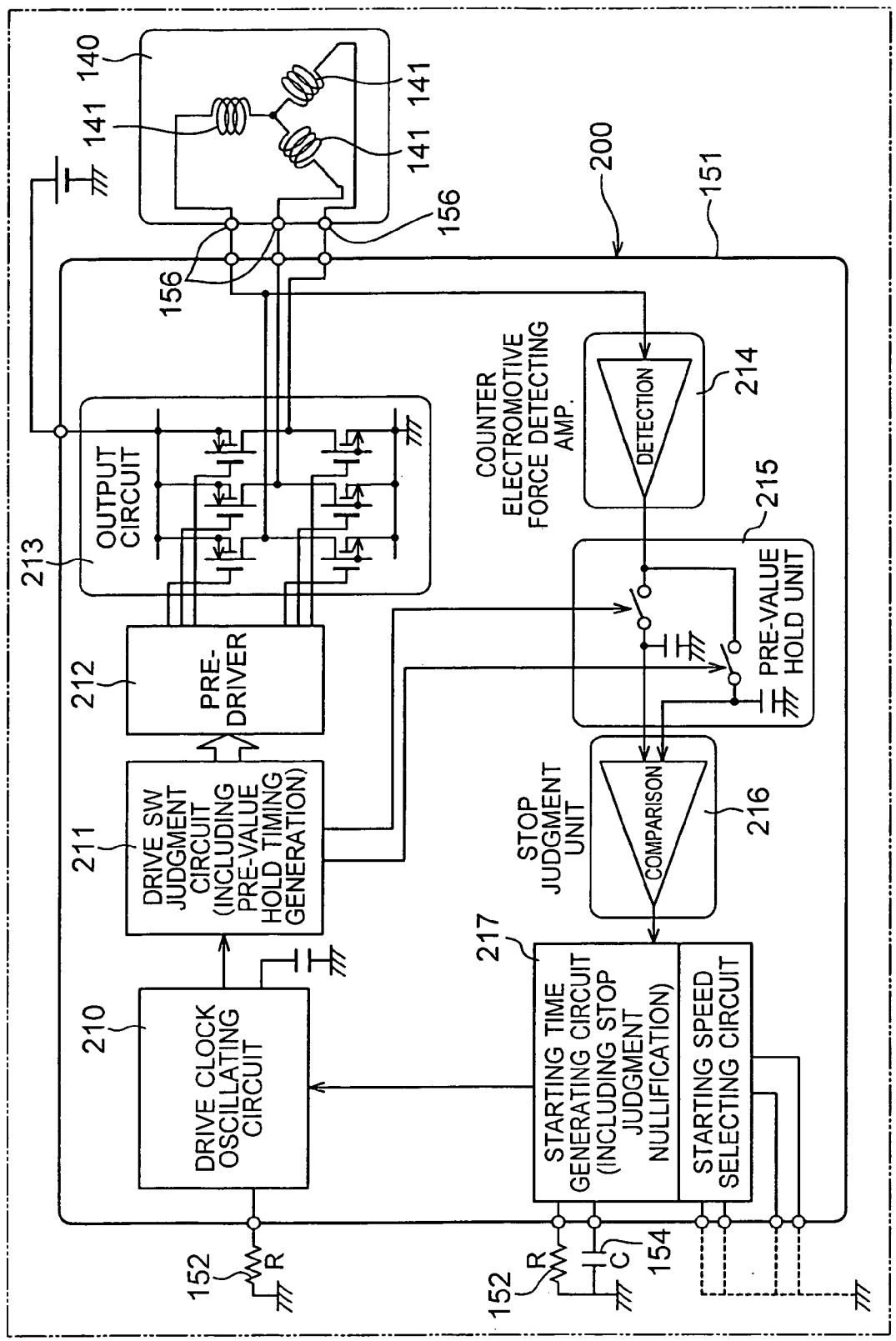
FIG. 10 is a block diagram showing a drive circuit.

As shown in FIG. 10, winding portions 141, 141, . . . of the coil 140 are connected to take-out electrodes 156, 156, 156 for U-phase, V-phase and W-phase provided on the circuit wiring board 150. These take-out electrodes 156, 156, 156 are connected to a drive circuit 200 through flexible wiring board (not shown), for example.

The drive circuit 200 includes electronic parts (components) 151, 152, 153, 154 which are externally electronic parts or components. The electronic component includes a drive clock oscillating circuit 210, a drive SW judgment circuit 211, a pre-driver 212, an output circuit 213, a counter electromotive force detecting amplifier 214, a pre-value hold unit 215, a stop judgment unit 216, and a starting time generating circuit & starting speed selecting circuit 217, etc.

The output circuit 213 is electrically connected to respective winding portions 141, 141, . . . of the coil 140 through the take-out electrodes 156, 156, 156.

At the drive circuit 200, the drive SW judgment circuit (drive switching pulse judgment circuit) 211 delivers, on the basis of clock that the drive clock oscillating circuit 210 oscillates, a switching signal for the output circuit 213 to the pre-driver 212. Thus, the pre-driver 212 amplifiers a drive switching signal to deliver the drive switching signal thus amplified to the output circuit 213. As a result, the output circuit 213 energizes the coil 140 by suitable three-phase full wave drive. Thus, the rotor 110 is rotated with the center axis CL of the fixed shaft 124 being as center with respect to the stator 120 by interaction between magnetic field that the rotor magnet 170 of the rotor 110 produces and magnetic fields that the respective winding portions 141, 141, . . . of the coil 140 produce.

Counter electromotive force obtained from a partial winding portion 141 of the coil 140 is detected by the counter electromotive force detecting amplifier 214. The counter electromotive force thus detected and counter electromotive force of a previous value which is held in advance at the pre-value hold unit 215 are compared by the stop judgment unit 216. Thus, the starting time generating circuit 217 generates rotation time of the rotor 110 to select starting speed.

The externally connected electronic parts (components) 152, 153 are resistor elements, and serves to perform, e.g., roles of preparing current for determining rated number of rotations of the rotor 110, or to prepare acceleration current.

The externally connected electronic component 154 is capacitor, and this capacitor performs a role for determining time constant for performing acceleration on the basis of acceleration current.

In the vibration generating device 100 according to the present invention, since the rotor 110 is formed as the result of the fact that respective members constituting the rotor 110 are molded in such a manner that they are integrated by material resin of the bearing sleeve 160, miniaturization and realization of thin structure of the rotor 110 are performed. Resultantly, miniaturization and realization of thin structure of the vibration generating device 100 can be made. Moreover, since the number of parts (components) is reduced, reduction of cost can be realized.

Further, since the bearing sleeve 160 of the rotor 110 is rotated in the state directly in contact with the bottom plate (stator yoke) 121, realization of thin structure of the vibration generating device can be hastened in this respect.

Further, since the motor is of the brushless type, reliability is excellent, stable operation can be made, and low power consumption is provided.

In this example, at the rotor 110, rotor yoke 190 is not essential. The rotor 110 may be composed of bearing sleeve 160, rotor magnet 170 and weight 180. In addition, if at least the bearing sleeve 160 and the rotor magnet 170 are integrally molded, considerable advantages/effects can be provided in regard to simplification, miniaturization and realization of thin structure, etc. of the structure of the rotor 110.

Then, another example of the vibration generating device according to the present invention will be explained with reference to FIG. 11.

At this vibration generating device 300, the stator 120 is similar to the stator 120 of the above-described vibration generating device, but the configuration of the rotor 310 is different from the rotor 110 of the above-described vibration generating device. Accordingly, the portion of the rotor 310 of which configuration is different from the rotor 110 used in the above-described vibration generating device will be explained in detail, and the detailed explanation of the stator 120 will be omitted by making reference to the example of the above-described vibration generating device.

Figure 11:
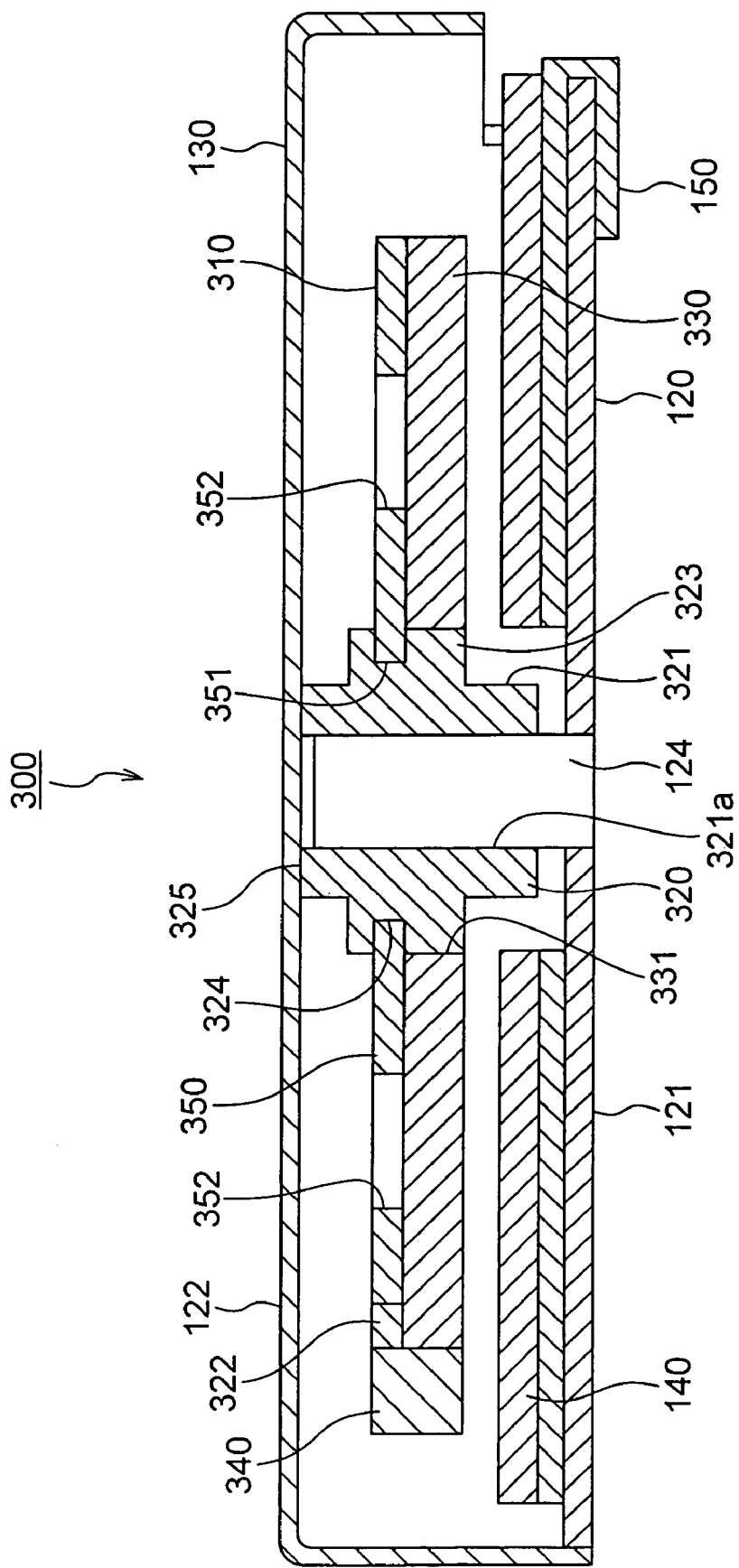
FIG. 11 is a longitudinal cross sectional view showing another example of the vibration generating device according to the present invention.

At the rotor 310 used in this example, as shown in FIG. 11, a bearing sleeve 320, a rotor magnet 330, a weight 340 and a rotor yoke 350 are integrally formed.

The bearing sleeve 320 is formed as resin molded material, and is adapted so that a substantially cylindrical main portion 321 and a peripheral edge coupling portion 322 positioned at the outer peripheral portion thereof are integrally formed through intermediate portion (not shown). The inside diameter of a center hole 321a formed in a manner penetrated through the center of the main portion 321 is formed so that it is slightly larger than the outside diameter of the fixed shaft 124 of the stator 120. It is preferable that the bearing sleeve 320 is formed by material having small friction coefficient. For example, it is preferable that the bearing sleeve 320 is formed by PPS (polyphenylene sulfide) or LCP in which carbon fibers or carbon beads are mixed. It is a matter of course that the bearing sleeve 320 may be formed by material except for materials illustrated here.

The rotor magnet 330 is formed so as to have doughnut shape or ring shape, and is formed in the state where S-poles and N-poles are multi-pole magnetized by using sintered material of neodymium system or samarium-cobalt system. Further, the rotor magnet 330 is integrally molded in the state where the inner circumferential surface 331 of the rotor magnet 330 is butted to the outer circumferential surface of a large diameter portion 323 formed at the position close to the upper end of the main portion 321 of the bearing sleeve 320.

The rotor yoke 350 is formed by magnetic material, e.g., iron, stainless steel plate or silicon steel plate having magnetic property, etc. so as to have doughnut shape or ring shape, and is integrally molded in the state where its inner circumferential edge 351 is fitted into a groove 324 formed at the upper end portion of the main portion 321 of the bearing sleeve 320. At the rotor yoke 350, plural opening portions 352, 352, . . . are formed at suitable positions. In FIG. 11, only two opening portions 352 are illustrated.

The weight 340 is formed so as to have circular arc shape, and is positioned over substantially half circumference at the outer circumferential portions of the rotor magnet 330 and the rotor yoke 350. In concrete terms, the peripheral edge coupling portion 322 of the bearing sleeve 320 is molded integrally with three members of the rotor magnet 330, the rotor yoke 350 and the weight 340. The weight 340 serves to take out, as vibration component, rotation unbalance energy when the rotor 310 is continuously rotated with the center axis of the fixed shaft 124 being as center with respect to the stator 120, and is formed by material having large specific gravity, e.g., tungsten, etc.

As explained above, the rotor 310 is adapted so that the bearing sleeve 320, the rotor magnet 330, the weight 340 and the rotor yoke 350 are integrally formed. More particularly, in performing injection molding of the bearing sleeve 320, the rotor magnet 330, the weight 340 and the rotor yoke 350 are inserted in advance at a predetermined position of the metal mold for molding the bearing sleeve 320 to inject material resin of the bearing sleeve 320 into the metal mold in that state so that the bearing sleeve 320, the rotor magnet 330, the weight 340 and the rotor yoke 350 are integrally formed.

At the above-described rotor 310, the bearing sleeve 320 is rotatably externally fitted over the fixed shaft 124 of the stator 120. Further, the rotor 310 is attracted toward the cover plate 122 by attractive force exerted between the cover plate 122 and the rotor magnet 330 so that there results the state where the upper end surface 325 of the bearing sleeve 320 is in contact with the cover plate 122. Of course, the attractive force is exerted also between the rotor magnet 330 and the bottom plate (stator yoke) 121. In this case, since plural opening portions 352, 352, . . . are formed at the rotor yoke 350, leakage magnetic flux from the opening portions 352, 352, . . . becomes many. Thus, attractive force between the rotor magnet 330 and the cover plate 122 becomes superior so that the rotor 310 is attracted toward the cover plate 122. It is to be noted that if there is employed an approach in which, in place of forming opening portions 352, 352, . . . at the rotor yoke 350, the thickness of the rotor yoke 350 may be thinned so that many magnetic flux leaks from the rotor magnet 330 toward the cover plate 122, the rotor 310 can be attracted toward the cover plate 122, or the rotor magnet 330 may be caused to be in peeled off state with respect to the cover plate 122 without providing the rotor yoke 350 so that the rotor 310 is attracted toward the cover plate 122.

Also in the vibration generating device shown in FIG. 11, miniaturization and realization of thin structure of the rotor 310 can be performed. As a result, miniaturization and realization of thin structure of the vibration generating device 300 can be performed. Moreover, since the number of parts is reduced, reduction in cost can be realized.

It is to be noted that if at least the rotor magnet 330 and the bearing sleeve 320 can be integrally molded, considerable advantages/effects can be provided in regard to simplification of the structure of the rotor 310, and miniaturization and realization of thin structure of the rotor 310, etc.

Further, since the bearing sleeve 320 of the rotor 310 is rotated in the state directly in contact with the cover plate 122, realization of thin structure of the vibration generating device is hastened also in this respect.

Further, since the motor is of brushless type, reliability is excellent, stable operation can be made, and low power consumption is provided.

Figure 12:
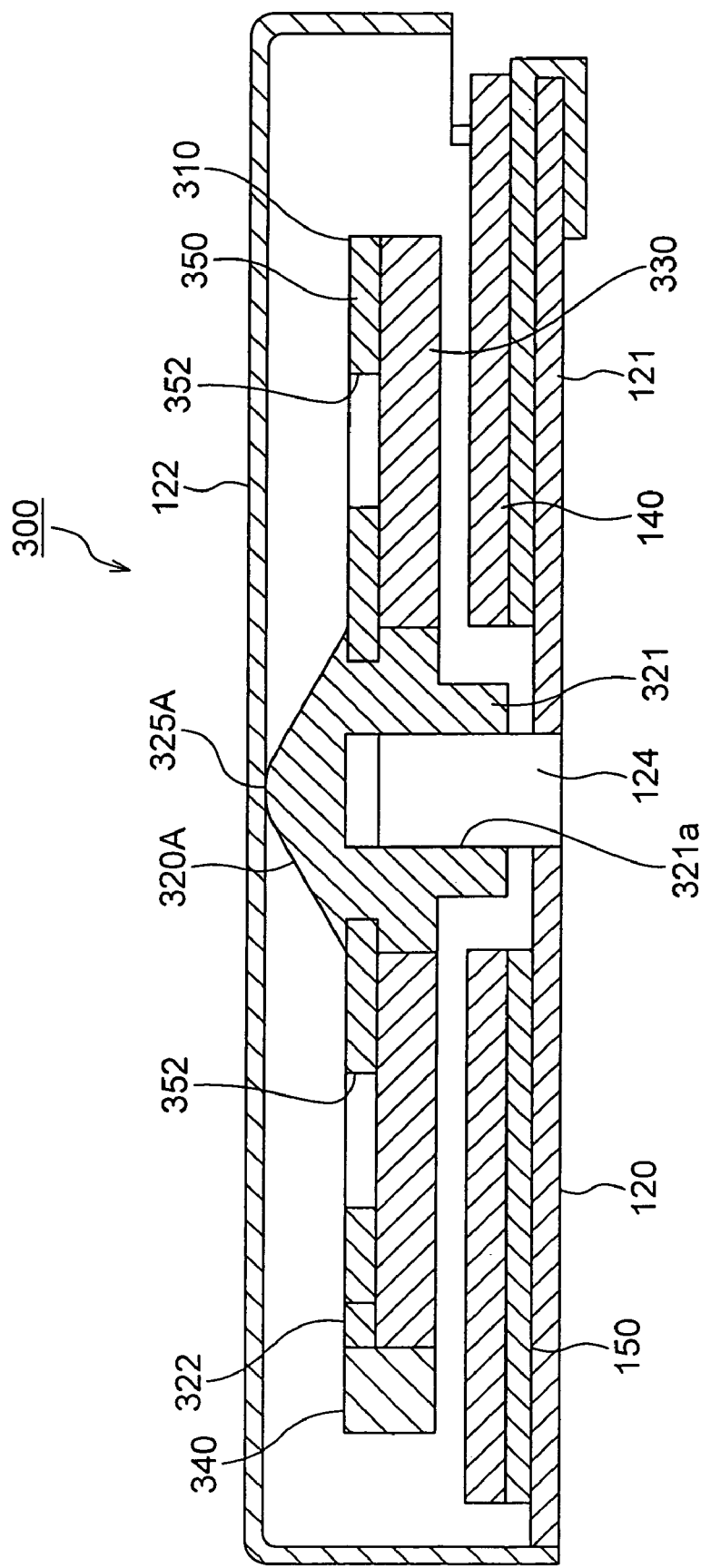
FIG. 12 is a longitudinal cross sectional view showing a further example of the vibration generating device according to the present invention.

In the above-described vibration generating device shown in FIG. 11, a bearing sleeve 320A may be constituted as shown in FIG. 12. The bearing sleeve 320A has a shape in which the upper end of the main portion 321 is closed, and is adapted so that the closed upper end surface 325A is formed so as to take semi-circular shape.

Accordingly, in this example, the upper end surface 325A of the bearing sleeve 320A is in contact with the lower surface of the cover plate 122 substantially as point. As a result, friction resistance at the time of rotation of the rotor 310 is reduced. Thus, satisfactory rotation of the rotor 310 can be obtained.

Figure 13:
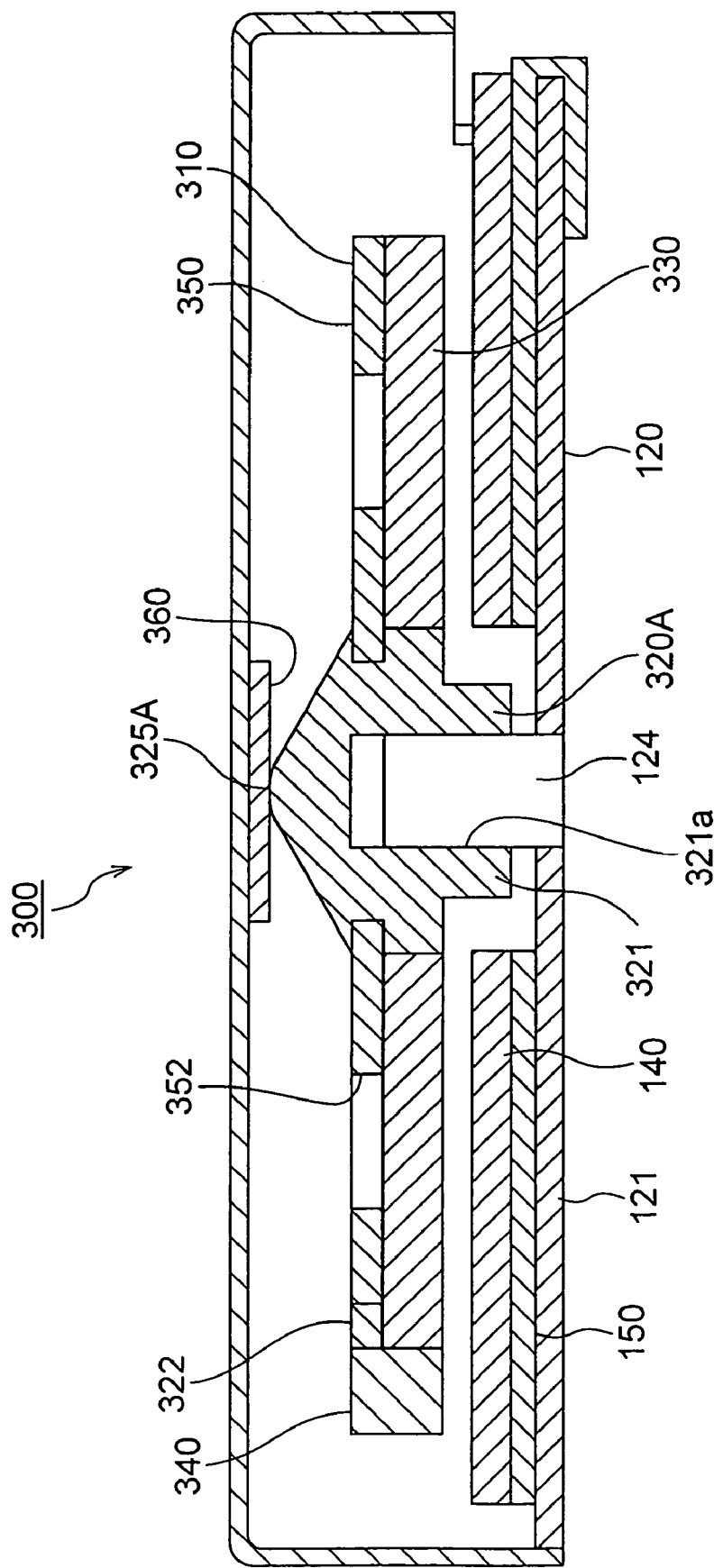
FIG. 13 is a longitudinal cross sectional view showing a still further example of the vibration generating device according to the present invention.

Further, the bearing sleeve 320A may be constituted as shown in FIG. 13. At the bearing sleeve 320A shown in FIG. 13, a thrust bearing 360 attached to the lower surface of the cover plate 122 is caused to intervene between the upper end surface 325A and the lower surface of the cover plate 122.

Accordingly, in this example, since friction resistance between the upper end surface 325A of the bearing sleeve 320A and the cover plate 122 is further reduced. Thus, further satisfactory rotation of the rotor 310 can be obtained.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

INDUSTRIAL APPLICABILITY

As described above, in the vibration generating device according to the present invention, shapes of respective members constituting the rotor becomes simple and the structure of the rotor itself becomes simple. As a result, miniaturization and realization of thin structure of the rotor itself can be performed. Since there is employed the structure in which the sleeve of the rotor externally fitted over the fixed shaft of the stator is rotated in the state in contact with the bottom plate or the cover plate, the bearing structure of the stator side becomes simple. Thus, miniaturization and realization of thin structure of the entirety of the vibration generating device can be performed.

Further, miniaturization and realization of thin structure of the electronic equipment using such a vibration generating device can be performed.

The invention claimed is:

1. A vibration generating device including a rotor, and a stator for rotatably supporting the rotor, and serving to rotate the rotor to thereby generate vibration, wherein the rotor comprises a bearing sleeve comprising resin molded material and rotatably fitted over a fixed shaft vertically provided at the stator, a rotor yoke, a magnet, and a weight positioned in eccentric state with respect to the bearing sleeve, and the bearing sleeve and the rotor yoke are integrated by molding with adhesion of the rotor yoke to material resin of the bearing sleeve, wherein the stator comprises, in addition to the fixed shaft, a bottom plate, a cover plate formed by magnetic material, and a coil disposed in a manner opposite to the magnet; and wherein the coil is energized so that the rotor is rotated, and the bearing sleeve is rotated in the state in contact with the cover plate by attractive force exerted between the magnet and the cover plate.

2. The vibration generating device as set forth in claim 1, wherein the weight is integrated with the bearing sleeve by material resin of the bearing sleeve.

3. The vibration generating device as set forth in claim 1, wherein the magnet is integrated with the bearing sleeve by material resin of the bearing sleeve.

4. The vibration generating device as set forth in claim 1, wherein contact between the bearing sleeve and the cover plate is point-contact.

5. The vibration generating device as set forth in claim 4, wherein, the upper end surface of the bearing sleeve is formed so as to have substantially spherical surface, and the upper end surface of the bearing sleeve is caused to be in point-contact with the cover plate by attractive force exerted between the cover plate and the magnet.

6. The vibration generating device as set forth in claim 1, wherein contact between the upper end surface of the bearing sleeve and the cover plate is surface-contact.

7. The vibration generating device as set forth in claim 1, wherein the portion with which the bearing sleeve is in contact of the bottom plate or the cover plate is caused to be plane surface.

8. The vibration generating device as set forth in claim 1, wherein the rotor yoke is positioned at the upper side of the magnet at the rotor, and an opening portion or portions is or are formed at the rotor yoke.

9. The vibration generating device as set forth in claim 1, wherein the rotor yoke is positioned at the upper side of the magnet at the rotor.

10. An electronic equipment comprising a vibration generating device including a rotor, and a stator for rotatably supporting the rotor, and serving to rotate the rotor to thereby generate vibration, wherein the rotor comprises a bearing sleeve comprising resin molded material and rotatably fitted over a fixed shaft vertically provided at the stator, a rotor yoke, a magnet, and a weight positioned in eccentric state with respect to the bearing sleeve, and the bearing sleeve and the rotor yoke are integrated by molding with adhesion of the rotor yoke to material resin of the bearing sleeve, wherein the stator comprises, in addition to the fixed shaft, a bottom plate, a cover plate formed by magnetic material and, a coil disposed in a manner opposite to the magnet, and wherein the coil is energized so that the rotor is rotated, and the bearing sleeve is rotated in the state in contact with the cover plate by attractive force exerted between the magnet and the cover plate.

11. The electronic equipment as set forth in claim 10, wherein the weight is integrated with the bearing sleeve by material resin of the bearing sleeve.

12. The electronic equipment as set forth in claim 10, wherein the magnet is integrated with the bearing sleeve by material resin of the bearing sleeve.

13. The electronic equipment as set forth in claim 10, wherein contact between the bearing sleeve and the cover plate is point-contact.

14. The electronic equipment as set forth in claim 13, wherein, the upper end surface of the bearing sleeve is formed so as to have substantially spherical surface, and the upper end surface of the bearing sleeve is caused to be in point-contact with the cover plate by attractive force exerted between the cover plate and the magnet.

15. The electronic equipment as set forth in claim 10, wherein contact between the upper end surface of the bearing sleeve and the cover plate is surface-contact.

16. The electronic equipment as set forth in claim 10, wherein the portion with which the bearing sleeve is in contact of the bottom plate or the cover plate is caused to be plane surface.

17. The electronic equipment as set forth in claim 10, wherein the rotor yoke is positioned at the upper side of the magnet at the rotor, and an opening portion or portions is or are formed at the rotor yoke.

18. The electronic equipment as set forth in claim 10, wherein the rotor yoke is positioned at the upper side of the magnet at the rotor.

* * * * *